United States Patent Office 3,038,016
Patented June 5, 1962

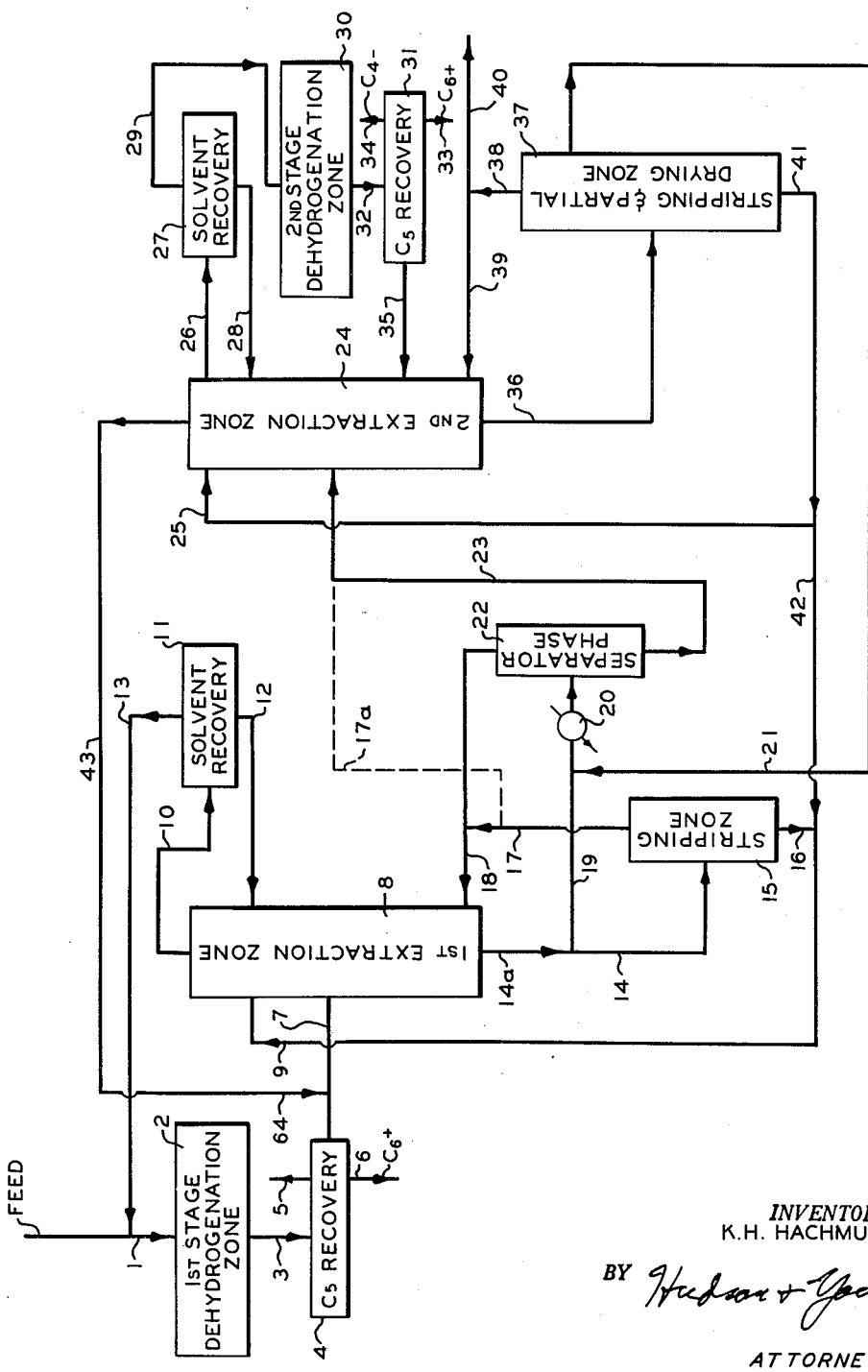

3,038,016
ISOPRENE SEPARATION
Karl H. Hachmuth, Bartlesville, Okla., assignor to Phillips Petroleum Company, a corporation of Delaware
Filed Aug. 17, 1959, Ser. No. 834,018
5 Claims. (Cl. 260—681.5)

This invention relates to separation of isoprene from close boiling mixture.

It is known in the art to prepare isoprene from isopentane by a two-stage dehydrogenation process. In the first stage, isopentane is dehydrogenated in the presence of an alumina or magnesia catalyst promoted with an oxide of a metal of group IV, V or VI of the periodic table. The resulting effluent is separated to recover isoprene and methylbutene. The methylbutenes are, in turn, dehydrogenated in the presence of a catalyst composed of a major amount of a potassium compound, a minor amount of iron oxide and a small amount of chromium oxide. Again, the effluent is treated to recover the isoprene product.

A marked contribution to successful commercial operations is made by the particular separation steps utilized. One conventional means for recovering isoprene comprises passing the effluent from the first stage dehydrogenation to conventional fractionation to remove $C_4$'s and lighter than $C_6$'s and heavier materials from the $C_5$ products. The $C_5$ products are passed to an extraction zone where the $C_5$'s are contacted with a selective solvent such as methyl carbitol containing 4.0 weight percent water. The overhead from this extraction zone comprising primarily isopentane is recycled to the dehydrogenation zone. The rich solvent bottom is stripped of the $C_5$ hydrocarbons which are passed to a second extraction zone where the selective solvent is more selective to the isoprene, e.g., methyl Carbitol with about 8 percent water. The methylbutenes pass overhead and are sent to the second stage dehydrogenation, fractionated to recover $C_4$'s and the $C_5$ returned to the second extraction zone, the rich solvent bottoms are passed to a stripper where the isoprene is recovered. Although this system has worked well, I have found by modifying the separation, the isoprene separation efficiency is improved significantly.

It is an object of this invention to provide an improved method of separating isoprene from other five carbon atom hydrocarbons.

Other objects, features and advantages of this invention will be seen by those skilled in the art having been given this disclosure.

The above and other objects are obtained according to this invention by passing the rich solvent phase from a first extraction zone to a second extraction zone at a level below the level of introduction of the lean solvent, passing the $C_5$ fraction from a second stage dehydrogenation zone to said second extraction zone at a level no higher than the level of introduction of the rich solvent fraction and removing isoprene extract product from a low level in said second extraction zone.

The FIGURE is a flow diagram of a preferred embodiment of this invention.

Referring to the drawing, isopentane feed passes via conduit 1 to dehydrogenation zone 2. The effluent from zone 2 passes via conduit 3 to $C_5$ recovery zone 4. In this zone 4, the $C_4$ and lighter materials are removed via conduit 5 and the $C_6$ and heavier materials are removed via conduit 6. This zone will ordinarily comprise two fractionation steps. The $C_5$'s from zone 4 comprising isopentane, isoprene and methylbutenes pass via conduit 7 to solvent extraction zone 8. These mixed $C_5$'s are contacted with a suitable polar solvent introduced via conduit 9 and the unsaturates are selectively extracted. The isopentane, along with some solvent, passes via conduit 10 to solvent recovery zone 11, e.g., a fractionation zone. The isopentane passes overhead from zone 11 via conduit 13 back to the dehydrogenation zone 2. The solvent is passed back to zone 8 via conduit 12.

The rich solvent stream removed from zone 8 via conduit 14a is split with a portion passing to stripper 15 via conduit 14 and a portion passing via conduit 19 and cooler 20 to phase separation 22. The rich solvent passing to stripper 15 is fractionated to produce lean solvent bottoms which are removed via conduit 16 and returned to zone 8 via conduit 9 and an overhead comprising $C_5$'s which pass via conduits 17 and 18 to extraction 8 as reflux. Water is added to that portion of the rich solvent passing in conduit 19 via conduit 21. This water acts as an antisolvent causing some hydrocarbon to come out of solution. This hydrocarbon and solvent are separated in phase separator 22 and the hydrocarbons are taken overhead via conduit 18 and returned to zone 8. The solvent containing $C_5$'s in solution is removed via conduit 23 from zone 22 and passed to extraction zone 24.

It is within the scope of this invention to pass all of the rich solvent from zone 8 to the phase separation and it is within the scope of this invention not to use a cooler such as 20. However, it is preferred to use the steps of stripping a portion of the rich solvent stream and the cooler for best operation of the extraction columns in order to assure the optimum return of $C_5$'s to the bottom of zone 8 and to control the water in the selective solvent at its optimum concentration. The $C_5$'s entering column 24 are contacted with a selective solvent introduced via conduit 25. This solvent is adjusted to selectively remove isoprene. The methylbutenes and solvent are removed via conduit 26 to solvent recovery zone 27, same type as zone 11, and the solvent returned to column 24 via conduit 28. The methylbutenes go overhead from zone 27 via conduit 29 to the second stage dehydrogenation zone 30. The effluent from zone 30 passes via conduit 32 to $C_5$ recovery zone 31. The $C_4$ and lighter materials are removed via conduit 34 and the $C_6$ and heavier materials are removed via conduit 33. The $C_5$'s are charged to the extraction zone 24 via conduit 35.

The rich solvent from the bottom of zone 24 passes via conduit 36 to stripping and partial drying zone 37. This zone will ordinarily comprise two fractionation columns, the hydrocarbons being stripped in the first column and water separated in the second column. The isoprene product from zone 37 passes overhead via conduit 38 and a portion returned to zone 24 via conduit 39 and a portion withdrawn as product via conduit 40. The solvent is removed from zone 37 via conduit 41 and a portion cycled to zone 24 via conduit 25 and a portion cycled to zone 8 via conduits 42 and 9. In case stripping zone 15 is not used, then all the solvent must be recovered in zone 37 which requires a greater throughput of solvent in zone 24. The water removed from the solvent in zone 37 is removed via conduit 21 and passed to conduit 19. Conduit 43 is provided for returning a portion of the overhead from zone 24 to zone 8 when needed to control the isopentane concentration in the olefin feed to the second dehydrogenation zone. The flow in this line is small and is generally circulated periodically as needed.

In the conventional system, all of the rich solvent from zone 8 passes to stripper 15 and the overhead from that stripper passes in part via conduits 17 and 18 to the zone 8 and in part via conduits 17 and 17a to extraction zone 24. Instead of zone 37 being a stripping zone and partial drier, it is a stripping zone only and all the solvent withdrawn via conduit 41 is returned via conduit 25 to the zone 24.

In the drawing, the $C_5$'s from the second dehydrogenation stage are fed to the second extraction zone below the point where the feed from the first extraction zone is introduced to take advantage of the higher relative concentration of isoprene in the feed from the second dehydrogenation step. This is not essential and the two feeds could be mixed and introduced together, if desired.

This invention is particularly useful for separating isoprene from other $C_5$ hydrocarbons where the feed mixture results from two stage dehydrogenation.

The selective solvent can be any of the many known polar solvents available to the art for extracting unsaturated hydrocarbons from more saturated hydrocarbons. Examples of such selective solvents include furfural, ethylene glycol, methyl Carbitol and ethyl cellusolve. The amount of water needed as antisolvent is readily determined by those skilled in the art.

SPECIFIC EMBODIMENT

A specific embodiment will be described in conjunction with the drawing and wherein isopentane is being dehydrogenated to form isoprene and methyl Carbitol is the selective solvent. Isopentane feed is dhydrogenated with a 20 percent chromia-80 percent alumina catalyst in dehydrogenation zone 2 which operates at 1050° F., a liquid hourly space velocity of 4.9 and substantially atmospheric pressure. After the light products and heavy products are removed, the mixture of isopentane, isoprene, 3-methylbutene-1, 2-methylbutene-1, and 2-methylbutene-2 is passed to column 8. The column is designed to operate at 80° F. with 29 equilibrium steps above the point of feed introduction and 25 steps below the point of feed introduction. On the basis of 100 pounds feed comprising 70.44 pounds isopentane, 4.40 pounds 3-methylbutene-1, 6.85 pounds 2-methylbutene-1 12.15 pounds 2-methylbutene-2, and 6.16 pounds isoprene including a small amount of piperylene, fed to zone 8, 2260.0 pounds of methyl Carbitol containing 4 percent water, e.g., 2169.6 pounds methyl Carbitol and 90.4 pounds water, is introduced to zone 8 via conduit 9. The overhead from this column passes via conduit 10 to a 4 to 6 tray column in zone 11 which operates at a temperature to separate isopentane from the solvent. From zone 11, a stream comprising 70.13 pounds isopentane, 0.64 pound 3-methylbutene-1, 0.04 pound 2-methyl-butene-1, and 0.03 pound 2-methylbutene-2 is returned via conduit 13 to zone 2. The rich solvent stream, 2813.01 pounds removed via conduit 14a, is split with the major stream passing to zone 15 which is a 4 to 6 tray column. The hydrocarbons are stripped in this column and pass overhead via conduit 17 and 18 to zone 8. The solvent, 1659.6 pounds methyl Carbitol and 69.1 pounds water is removed via conduit 16 and passed via conduit 9 to zone 8. The remaining material removed via conduit 14a passes via conduit 19 and cooler 20 to separation 22. 56.7 pounds of water is added to the stream in conduit 19 via conduit 21 and the temperature of separation zone 22 is about 70° F. This additional water causes some of the hyrocarbon to come out of solution and these hydrocarbons pass via conduit 18 after being mixed with the material from conduit 17 to zone 8 for a total reflux of 467.17 pounds. The rich solvent, comprising 0.29 pound isopentane, 3.76 pounds 3-methyl-butene-1, 6.81 pounds 2-methylbutene-1, 12.12 pounds 2-methylbutene-2, 6.16 pounds isoprene, 510.0 pounds methyl Carbitol and 79 pounds water is passed via conduit 23 to zone 24 at a position 23 steps below the top and 36 steps above the bottom. This column, like column 8, operates in liquid phase at 80° F.

The olefins and solvent passing overhead from column 24 pass via conduit 26 to a solvent recovery zone 27 of the same type as zone 11 and the solvent returned via conduit 28 to zone 24. The overhead from zone 27 comprising 0.99 pound isopentane, 6.25 pounds 3-methylbutene-1, 18.07 pounds 2-methylbutene-1, 21.29 pounds 2-methylbutene-2 and 0.28 pound isoprene passes via conduit 29 to dehydrogenation zone 30. This dehydrogenation zone contains a catalyst consisting of 44.6 percent $Fe_2O_3$, 52.2 percent $K_2CO_3$ and 3.2 percent $Cr_2O_3$ and operates with a liquid hourly space velocity of 2.0, a temperature of 1175° F. and with steam added at a ratio of $H_2O/HC$ of 10:1. The effluent from zone 30 is passed to zone 31, cooled and water removed via phase separation and the lighter and heavier hydrocarbons are removed from the $C_5$'s in columns such as in zone 4. The $C_5$ stream comprising 0.70 pound isopentane, 2.49 pounds 3-methylbutene-1, 11.30 pounds 2-methylbutene-1, 19.25 pounds 2-methylbutene-2 and 19.99 pounds isoprene is passed via conduit 19 to zone 24, 7 steps below the point where feed from separation 22 is introduced. The bottoms from zone 24 are passed via conduit 36 to zone 37 where the isoprene product is stripped and removed via conduit 38. A stream comprising 0.04 pound 2-methyl-butene-1, 0.08 pound 2-methylbutene-2 and 25.87 pounds isoprene is removed as product via conduit 40 while 529 pounds of a stream of the same composition is returned as reflux to column 24. As has been indicated, 56.7 pounds water is removed from zone 37 via conduit 21 and returned to the system in conduit 19. A methyl Carbitol solvent, 1193.5 pounds methyl Carbitol and 49.8 pounds water is removed via conduit 41 with the stream being split as previously indicated.

The general flow of the conventional system has been indicated. With the same operating conditions, based on 100 pounds mixed $C_5$ feed to column 8, the material balance for the two systems is given below.

*TABLE I (Conventional System)*

STREAM COMPOSITIONS AND QUANTITIES (LBS./100 LBS. FEED)

| Stream | 7 | 9 | 13 | 17a | 35 | 29 | 40 | 25 | 36 |
|---|---|---|---|---|---|---|---|---|---|
| Compound: | | | | | | | | | |
| Isopentane | 70.44 | | 70.15 | 0.29 | 0.70 | 0.99 | | | |
| 3-methylbutene-1 | 4.40 | | 0.64 | 3.76 | 2.49 | 6.25 | | | |
| 2-methylbutene-1 | 6.85 | | 0.04 | 6.81 | 11.30 | 18.07 | 0.04 | | |
| 2-methylbutene-2 | 12.15 | | 0.03 | 12.12 | 19.25 | 31.29 | 0.08 | | |
| Isoprene [1] | 6.16 | | | 6.16 | 19.99 | 0.28 | 25.87 | | |
| Methyl Carbitol | | 2169.6 | | | | | | 927.2 | |
| Water | | 90.4 | | | | | | 82.8 | |
| Total | 100.0 | 2,260.0 | 70.86 | 29.14 | 53.73 | 56.88 | 25.99 | 1,010.0 | 1,402.99 |

*Table 1*—Continued

IMPROVED SYSTEM—STREAMS 7, 9, 13, 35, 29, 40 SAME AS ABOVE

| Streams | 16 | 23 | 25 | 41 | 21 | 36 |
|---|---|---|---|---|---|---|
| Compound: | | | | | | |
| Isopentane | | 0.29 | | | | |
| 3-methylbutene-1 | | 3.76 | | | | |
| 2-methylbutene-1 | | 6.81 | | | | |
| 2-methylbutene-2 | | 12.12 | | | | |
| Isoprene [1] | | 6.16 | | | | |
| Methyl Carbitol | 1,659.6 | 510.0 | 683.5 | 1,193.5 | | |
| Water | 69.1 | 78.0 | 28.5 | 49.8 | 56.7 | |
| Total | 1,728.7 | 617.14 | 712.0 | 1,243.3 | 56.7 | 1,854.99 |

[1] A small amount of piperylene is included in the isoprene.

In the conventional system, conduit 23 enters zone 24 at a position 29 steps below the top and 42 steps above the bottom. The $C_5$'s from zone 31 enter zone 24 via conduit 35 at a position 9 steps below conduit 23.

The advantages of the improved system are summarized in the following table:

|  | Conventional | Improved |
|---|---|---|
| Total solvent to stripper, pounds [1] | 3,270 | 3,028 |
| Equilibrium steps, first tower | 54 | 54 |
| Equilibrium steps, second tower | 71 | 59 |

[1] Per 100 pounds mixed feed to 1st extraction zone.

The improved system requires 12 fewer equilibrium steps. Using very efficient and expensive actual trays or steps the savings in equipment would be at least 24 trays and with 1 foot spacing this amounts to 24 feet of expensive column. This is accomplished with the addition of a relative inexpensive phase separation vessel and a small and simple bubble cap fractionator.

Those skilled in the art will see numerous modifications which can be made and still obtain the advantage of this invention.

I claim:

1. In a process wherein isoprene is separated from other five carbon atom hydrocarbons by liquid-liquid extraction in a pair of extraction columns, the improvement comprising passing a mixture of $C_5$ hydrocarbons to a first extraction zone, contacting said mixture with a solvent selective toward the more unsaturated hydrocarbons, withdrawing a solvent rich stream from said first extraction zone, passing the solvent rich stream to a second extraction zone at an intermediate elevation, introducing lean solvent at an elevated position in said second extraction zone, introducing an antisolvent into said solvent rich stream thereby causing a portion of the $C_5$ hydrocarbons to separate, introducing additional mixture of $C_5$ hydrocarbons to said second extraction zone at an elevation no higher than the introduction of rich solvent and withdrawing an isoprene rich solvent from a low-elevation of said second extraction zone.

2. In a process wherein isoprene is separated from other $C_5$ hydrocarbons of lower degree of unsaturation by liquid-liquid extraction the improvement comprising passing a mixture of $C_5$ hydrocarbon containing isoprene and hydrocarbons of a lower degree of unsaturation to a first extraction zone, contacting in liquid-liquid relationship said mixture with a polar solvent selective toward more unsaturated hydrocarbons to remove unsaturated hydrocarbons from saturated hydrocarbons, withdrawing the olefin rich solvent stream, passing a major portion of the withdrawn stream to a stripping zone wherein $C_5$ hydrocarbons are separated from the solvent, passing the $C_5$ ns to said first extraction zone as reflux, adding the remainder of the withdrawn rich causing a portion of the $C_5$ hydrocarbons to separate, passing the separated $C_5$ hydrocarbons back to said first extraction zone as reflux, passing the rich solvent stream containing the antisolvent to a second extraction zone intermediate its top and bottom, introducing additional polar solvent at an elevated position in said second extraction zone, introducing additional mixture of $C_5$ hydrocarbons containing isoprene to said second extraction zone at a level no higher than the level of introduction of the solvent rich stream, withdrawing isoprene rich solvent from the bottom of said second extraction zone, recovering isoprene and returning solvent to the extraction zones.

3. The improvement of claim 2 wherein the extractive solvent introduced to each extraction zone is methyl Carbitol containing 4 percent water and the antisolvent is water in an amount to provide 8 percent water in methyl Carbitol in the lower level of said second extraction zone.

4. A process for producing isoprene from isopentane comprising passing isopentane to a first dehydrogenation zone, recovering $C_5$ hydrocarbons from the effluent from said dehydrogenation zone, passing the $C_5$ hydrocarbons to an intermediate level in a first extraction zone, introducing a polar solvent selective toward olefinic hydrocarbons to an upper level in said extraction zone, withdrawing saturated hydrocarbon along with solvent from an upper level of said first extraction zone, separating solvent and saturated hydrocarbons thus withdrawn, cycling the saturated hydrocarbon to said first dehydrogenation zone, returning the separated solvent to said first extraction zone as top reflux, withdrawing solvent rich in olefins from a low level of said first extraction zone, passing a major portion of the rich solvent to a separation zone wherein hydrocarbons are separated from solvent, returning the separated hydrocarbons to said first extraction zone as bottoms reflux, cycling the separated solvent to an upper level of said first extraction zone as said polar solvent, introducing an antisolvent to the remainder of the rich solvent causing a portion of the less saturated hydrocarbons to separate, returning the separated hydrocarbons to said first extraction zone as reflux, passing the thus treated rich solvent along with the antisolvent to an intermediate level in a second extraction zone, introducing lean solvent to an upper level of said second extraction zone, withdrawing $C_5$ hydrocarbons of a low degree of unsaturation along with solvent from an upper level of said second extraction zone, separating solvent from the withdrawn $C_5$ hydrocarbons and returning same to said second extraction zone, passing the withdrawn $C_5$ hydrocarbons to a second dehydrogenation zone, separating resulting $C_5$ hydrocarbons from the effluent of said second dehydrogenation zone and returning them to said second extraction zone at a level no higher than the level of introduction of said rich solvent and antisolvent, withdrawing solvent rich in isoprene from the bottom of said second extraction zone, separating isoprene, solvent and antisolvent from the withdrawn stream, passing a portion of the isoprene to said second extraction zone as bottom reflux, recovering the remainder of the isoprene, cycling the separated solvent to said extraction zones and returning the antisolvent to said remainder of rich solvent from said first extraction zone.

5. The process of claim 4 wherein the extractive solvent is methyl Carbitol containing 4 percent water and the antisolvent is water in an amount to provide 8 percent water in the lower level of said second extraction zone.

References Cited in the file of this patent

UNITED STATES PATENTS

| | | |
|---|---|---|
| 2,379,332 | Arnold | June 25, 1945 |
| 2,770,663 | Grote | Nov. 13, 1956 |
| 2,834,820 | Bloch | May 13, 1958 |